(12) United States Patent
Jin et al.

(10) Patent No.: US 10,720,961 B2
(45) Date of Patent: Jul. 21, 2020

(54) DIGITAL ECHO CANCELLATION WITH SINGLE FEEDBACK

(71) Applicant: Cisco Technology, Inc., San Jose, CA (US)

(72) Inventors: Hang Jin, Plano, TX (US); John T. Chapman, Coto de Caza, CA (US)

(73) Assignee: Cisco Technology, Inc., San Jose, CA (US)

( * ) Notice: Subject to any disclaimer, the term of this patent is extended or adjusted under 35 U.S.C. 154(b) by 176 days.

(21) Appl. No.: 15/943,982

(22) Filed: Apr. 3, 2018

(65) Prior Publication Data

US 2019/0305815 A1    Oct. 3, 2019

(51) Int. Cl.
  *H04B 3/23* (2006.01)
  *H04L 12/28* (2006.01)
  *H04L 5/14* (2006.01)

(52) U.S. Cl.
  CPC .......... *H04B 3/23* (2013.01); *H04L 5/14* (2013.01); *H04L 12/2801* (2013.01)

(58) Field of Classification Search
  CPC .......... H04B 3/23; H04L 5/14; H04L 12/2801
  See application file for complete search history.

(56) References Cited

U.S. PATENT DOCUMENTS

| | | | |
|---|---|---|---|
| 2003/0028339 A1* | 2/2003 | Caso | H03M 1/1014 702/90 |
| 2003/0028372 A1* | 2/2003 | McArthur | G10L 21/0208 704/220 |
| 2014/0086433 A1* | 3/2014 | Josefsson | H04R 3/06 381/98 |
| 2015/0085718 A1* | 3/2015 | Chen | H04B 7/2656 370/280 |
| 2016/0036490 A1* | 2/2016 | Wu | H04B 3/32 375/257 |
| 2018/0219577 A1* | 8/2018 | Zhang | H04B 3/23 |

* cited by examiner

*Primary Examiner* — Jamal Javaid
*Assistant Examiner* — Thad N Defauw
(74) *Attorney, Agent, or Firm* — Merchant & Gould P.C.

(57) ABSTRACT

Echo cancellation may be provided. First, a feedback signal corresponding to a plurality of downstream paths may be received. Next, during an upstream silence period, a sample of a combination upstream signal may be received comprising a combination of upstream signals from a plurality of upstream paths. An echo correcting signal may then be created using the received feedback signal and the received sample of the combination upstream signal. Downstream echoes may be cancel from the combination upstream signal based on the created echo correcting signal.

20 Claims, 3 Drawing Sheets

DIGITAL ECHO CANCELLATION WITH SINGLE FEEDBACK

TECHNICAL FIELD

The present disclosure relates generally to echo cancellation.

BACKGROUND

A Hybrid Fiber-Coaxial (HFC) network is a broadband network that combines optical fiber and coaxial cable. It has been commonly employed globally by cable television operators. In a HFC cable network, television channels are sent from a cable system's distribution facility to local communities through optical fiber trunk lines. At the local community, a box translates the signal from a light beam to electrical signal, and sends it over cable lines for distribution to subscriber residences. The optical fiber trunk lines provide adequate bandwidth to allow future expansion and new bandwidth-intensive services.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
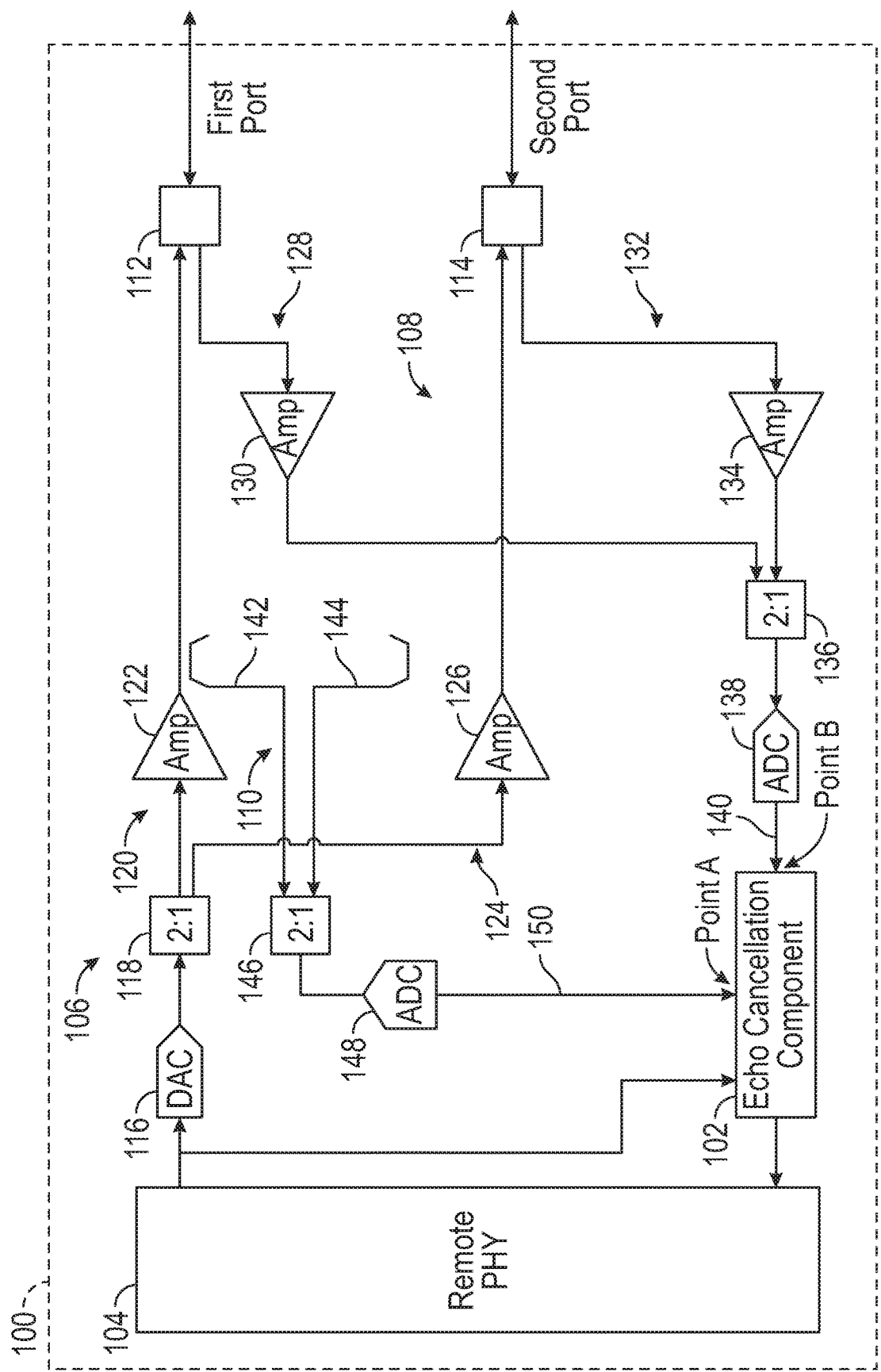
FIG. 1 is a block diagram of a system for providing echo cancellation.

Echo cancellation may be provided. First, a feedback signal corresponding to a plurality of downstream paths may be received. Next, during an upstream silence period, a sample of a combination upstream signal may be received comprising a combination of upstream signals from a plurality of upstream paths. An echo correcting signal may then be created using the received feedback signal and the received sample of the combination upstream signal. Downstream echoes may be cancel from the combination upstream signal based on the created echo correcting signal.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

EXAMPLE EMBODIMENTS

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Multiple-system operators (MSOs) are operators of multiple cable or direct-broadcast satellite television systems. These systems may include HFC networks. To amplify upstream (US) signals and downstream (DS) signals in the HFC network, MSOs may use nodes deployed within the HFC. In the HFC network, a node may comprise a container that may house optical and electrical circuitry. An optical fiber cable or a coaxial cable may be connected to an US side of the node and a plurality of coaxial cables may be connected to a DS side of the node. The US side of the node may be connect to a headend in the HFC network and the DS side of the node may be connected to Customer Premises Equipment (CPE) of subscribers to the HFC. Amplifiers may be used in the node to amplify upstream (US) signals and downstream (DS) signals. Embodiments of the disclosure may provide a digital echo cancellation (EC) process that may only need a single feedback path for a node with multiple ports for supporting full duplex (FDX) Data Over Cable Service Interface Specification (DOCSIS) operation.

FIG. 1 is a block diagram of a system for providing echo cancellation with a single feedback consistent with embodiments of the disclosure. As shown in FIG. 1, system 100 may comprise an echo cancelation component 102, a remote PHY 104, a plurality of downstream paths 106, a plurality of upstream paths 108, a feedback pathway 110, a first coupler 112 (e.g., at a first port), and a second coupler 114 (e.g., at a second port). While FIG. 1 shows two ports, system 100 may comprise any number of ports and is not limited to two ports.

System 100 may comprise a node in an HFC network. The node may comprise a container that may house optical and electrical circuitry. An optical fiber cable may be connected to one side of the node and a plurality of coaxial cables may be connected to the other side of the node. The optical fiber cable may be connected to a cable modem termination system (CMTS) in a headend in the HFC network and the plurality of coaxial cables may be connected to CPE of subscribers to the HFC. As such, the node may facilitate communications between the headend and the CPE. Consistent with embodiments of the disclosure, system 100 may comprise an FDX amplifier supporting FDX Data Over Cable Service Interface Specification (DOCSIS) operation.

The CMTS may comprise a device located in a service provider's (e.g., a cable company's) headend that may be used to provide high speed data services, such as cable Internet or Voice-Over-Internet Protocol, to subscribers. Remote physical layer (i.e., RPHY) may comprise shifting or distributing the physical layer (i.e., PHY) of a conventional cable headend CMTS to fiber nodes (e.g., RPHY nodes) in a network. Remote. Remote PHY 104 may comprise circuitry to implement the physical layer of the CMTS.

Echo cancelation component 102 may be practiced in an electrical circuit comprising discrete electronic elements, packaged or integrated electronic chips containing logic gates, a circuit utilizing a microprocessor, or on a single chip containing electronic elements or microprocessors. Furthermore, echo cancelation component 102 may also be practiced using other technologies capable of performing logical operations such as, for example, AND, OR, and NOT, including but not limited to, mechanical, optical, fluidic, and quantum technologies. As described in greater detail below with respect to FIG. 3, echo cancelation component 102 may be practiced in a computing device 300.

Regarding plurality of downstream paths 106, remote PHY 104 may send a digital downstream signal to a downstream digital-to-analog converter 116 that my convert the received digital downstream signal and convert it to an analog downstream signal. Digital-to-analog converter 116 may provide the analog downstream signal to a downstream splitter 118 that may split the analog downstream signal and place it into a first downstream path 120 that may feed a first downstream amplifier 122 and a second downstream path 124 that may feed a second downstream amplifier 126. First downstream amplifier 122 may provide the signal on first downstream path 120 to first coupler 112. Similarly, second downstream amplifier 126 may provide the signal on second downstream path 124 to second coupler 114. First coupler 112 may provide the signal from first downstream path 120 to first customer premises equipment and second coupler 114 may provide the signal from second downstream path 124 to second customer premises equipment. First customer premises equipment and second customer premises equipment may comprise, but are not limited to, a cable modem, a cellular base station, a tablet device, a mobile device, a smart phone, a telephone, a remote control device, a set-top box, a digital video recorder, a personal computer, a network computer, a mainframe, a router, or other similar microcomputer-based device.

Plurality of upstream paths 108 may comprise a first upstream path 128 that may feed a first upstream amplifier 130 and a second upstream path 132 that may feed a second upstream amplifier 134. An upstream combiner 136 may combine a first upstream signal amplified by first upstream amplifier 130 and a second upstream signal amplified by second upstream amplifier 134 and feed it to an upstream analog-to-digital converter 138. The output of analog-to-digital converter 138 may comprise a combination upstream signal 140 that may be fed to echo cancelation component 102. First coupler 112 may receive the first upstream signal from first customer premises equipment and second coupler 114 may receive the second upstream signal from second customer premises equipment.

Feedback pathway 110 may comprise a first feedback pathway 142 and a second feedback pathway 144. First feedback pathway 142 may sample the output of first downstream amplifier 122 and second feedback pathway 144 may sample the output of second downstream amplifier 126. Feedback combiner 146 may combine the sampled signal from first downstream path 120 and the sampled signal from second downstream path 124 and feed the combined signal to feedback analog-to-digital converter 148. The digital output of feedback analog-to-digital converter 148 may be fed to echo cancelation component 102 as feedback signal 150.

Echoes within system 100 may be present in combination upstream signal 140. For example, these echoes may be present due to a reflection in first coupler 112 of the signal in first downstream path 120 and a reflection in second coupler 114 of the signal in second downstream path 124. The echo from first coupler 112 may be reflected back into first upstream path 128 and the echo from second coupler 114 may be reflected back into second upstream path 132. The echoes may contain both the downstream signal and noise generated first downstream amplifier 122 and second downstream amplifier 126. Embodiments of the disclosure may cancel the echoes using a single feedback path.

Echoes reflected back not only contain the downstream signal, but also the noise generated by the downstream amplifiers. The noise generated by the downstream amplifiers (e.g., and DAC, and other analog devices) could have significant impact on the echo cancelation performance may not be ignored. Consequently, in order to cancel out the noise generated, a feedback path that samples the output (i.e., noise) of the node may be used. Embodiments of the disclosure may use a single feedback path to sample the noise of all the ports thus providing a significant cost reduction. This process may leverage the non-linear correlation among the downstream amplifiers, techniques for channel correlation tracking, and the upstream silence period specified in FDX DOCSIS 3.1 standard for example.

Figure 2:
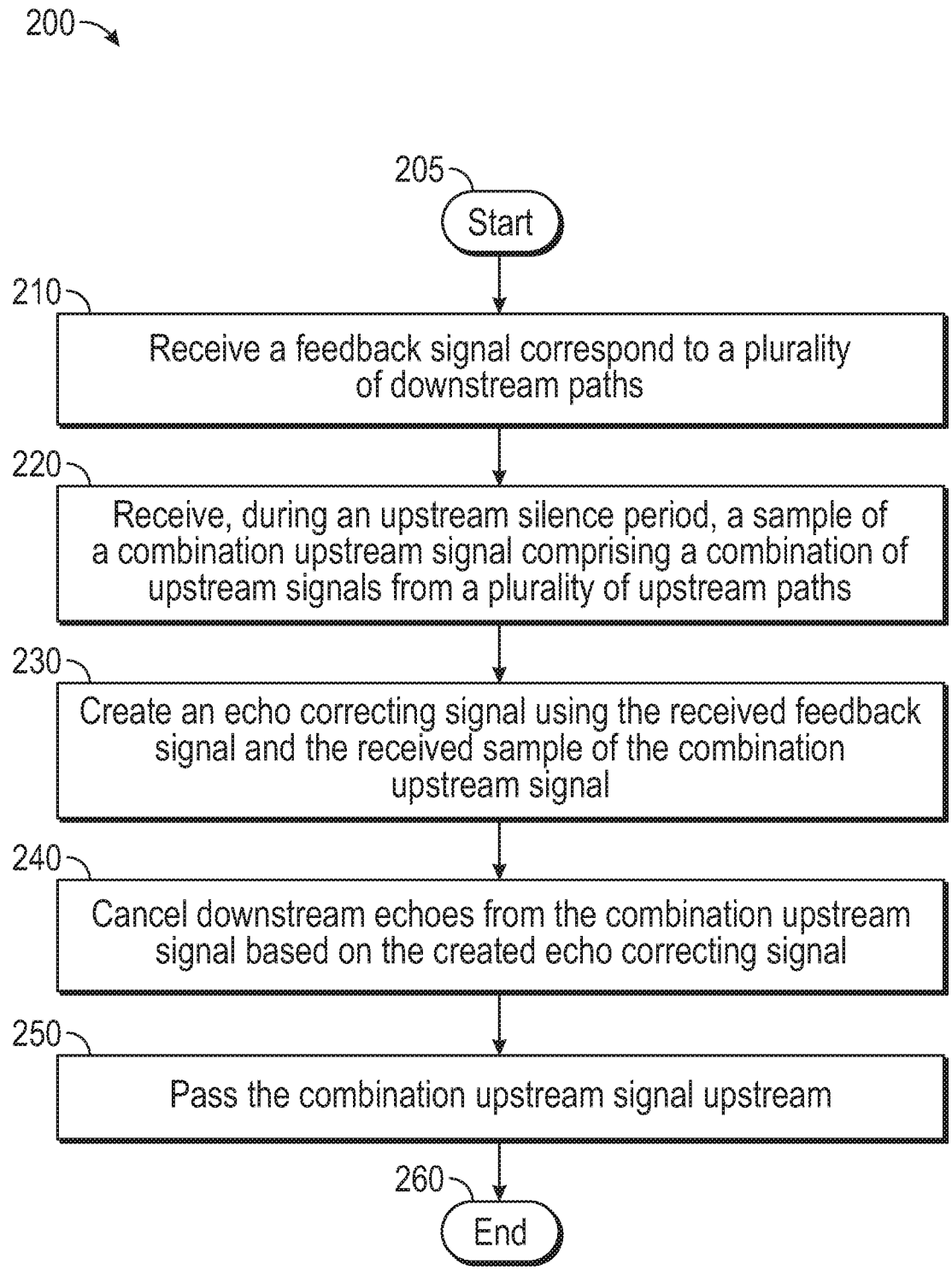
FIG. 2 is a flow chart of a method for providing echo cancellation.

FIG. 2 is a flow chart setting forth the general stages involved in a method 200 consistent with an embodiment of the disclosure for providing echo cancellation. Method 200 may be implemented using echo cancelation component 102 as described in more detail above with respect to FIG. 1. Ways to implement the stages of method 200 will be described in greater detail below.

Method 200 may begin at starting block 205 and proceed to stage 210 where echo cancelation component 102 may receive feedback signal 150 corresponding to plurality of downstream paths 106. For example, the outputs of all the downstream amplifiers (i.e., first downstream amplifier 122 and second downstream amplifier 126) may be sampled and combined by feedback combiner 146 in the analog domain. Then the combined signal may be fed into a single ADC (i.e., feedback analog-to-digital converter 148), converted into feedback signal 150, and fed to echo cancelation component 102. For each port, the sampled signal can be written as follows:

$$C_i = S_i + N_i, \ i = 1, 2, 3, 4 \ldots$$

where $S_i$ and $N_i$ are the DS signal and the associated noise of ith port. (The example of FIG. 1 has two ports.)

The dominant component of the noise results from amplifier nonlinearity, the noise is strongly correlated with the signal, so:

$$C_i = S_i + f_i(S_i)$$

where $f_i$ is a generic function describing the relationship between signal $S_i$ and the noise $N_i$ for ith port (ith amplifier). Generally, $f_i$ is a non-linear function.

From stage 210, where echo cancelation component 102 receives feedback signal 150 corresponding to plurality of downstream paths 106, method 200 may advance to stage 220 where echo cancelation component 102 may receive, during an upstream silence period, a sample of combination upstream signal 140 comprising a combination of upstream signals from plurality of upstream paths 108. For example, upstream combiner 136 may combine a first upstream signal amplified by first upstream amplifier 130 and a second upstream signal amplified by second upstream amplifier 134 and feed it to upstream analog-to-digital converter 138. The output of analog-to-digital converter 138 may comprise a combination upstream signal 140 that may be fed to echo cancelation component 102. Because there may be no upstream signals (i.e., transmissions) from customer premises equipment (e.g., cable modems) during the upstream silence period, the upstream signals from plurality of upstream paths 108 during the upstream silence may comprise echoes coupled from plurality of downstream paths 106 to plurality of upstream paths 108 due to full duplex operation for example.

Once echo cancelation component 102 receives the sample of combination upstream signal 140 in stage 220, method 200 may continue to stage 230 where echo cancelation component 102 may create an echo correcting signal using received feedback signal 150 and the received sample of combination upstream signal 140. For example, received feedback signal 150 may comprise C_A and combination upstream signal 140 may comprise C_B. Embodiments of the disclosure may compare these two signals. C_A may comprise the reference signal, which is known. C_B, which is sought, may contain two components:

$$C\_B = C\_B\_DS + C\_B\_US$$

Where C_B_DS is the echoes coupled from DS traffics, which includes the DS signal and the DS noise. C_B_US is the desired US signal. We know C_A, but we need C_B_DS—the echoes that need be cancelled. So embodiments of the disclosure may establish a relationship between C_A and C_B_DS.

In order to establish the relationship between C_A and C_B_DS, an US silence period may be scheduled. (A silence period may part of FDX DOCSIS 3.1 standard). Then the C_B signal may be recorded. Because there is no US traffic due to the scheduled silence period, C_B=C_B_DS. C_A may also be recoded at this point.

Next, C_A and C_B_DS can be written as follows:

$$C\_A = \text{sum}(hi * c\_ai); C\_B\_DS = \text{sum}(gi * c\_b\_dsi)$$

Where hi is the channel from ith output to point A, c_ai is DS signal at ith port; gi is the channel from ith output to point B, c_b_dsi is DS signal at ith port. * stands for convolution.

All DS ports have the same DS output, and as amplifier non-linear noise is correlated with the DS signal, all ports have the DS noise correlation as well. So, we have:

$$C\_A = \text{sum}(hi) * s = H * s, C\_B\_DS = \text{sum}(gi) * s = G * s$$

Where s is the DS signal at each port (same for all ports)

The correlation of nonlinear noise to signal may be consistent for the downstream amplifiers to the accuracy at least 40 dB. For echo cancellation, the noise floor may only need to be cancel out by ~10 dB. Accordingly, the correlation between signal and noise (e.g., function fi) may be the same for all the downstream amplifiers.

Once G and H are obtained during the US silence period, the reference required to generate the correcting signal for digital EC may be:

$$\text{Ref} = (C\_A * G * H^{-1})$$

Where G is the channel observed during the US silence period. * stands for convolution.

Accordingly, consistent with embodiments of the disclosure, echo cancelation component 102 may use the aforementioned process to create the echo correcting signal (e.g., Ref).

After echo cancelation component 102 creates the echo correcting signal in stage 230, method 200 may proceed to stage 240 where echo cancelation component 102 may cancel downstream echoes from combination upstream signal 140 based on the created echo correcting signal. For example, echo cancelation component 102 may subtract the echo correcting signal (e.g., Ref) from combination upstream signal 140 (e.g., C_B).

From stage 240, where echo cancelation component 102 cancels downstream echoes from combination upstream signal 140, method 200 may advance to stage 250 where echo cancelation component 102 may pass combination upstream signal 140 upstream. For example, echo cancelation component 102 may pass combination upstream signal 140 upstream to Remote Phy 104. Once echo cancelation component 102 passes combination upstream signal 140 upstream in stage 250, method 200 may then end at stage 260.

Figure 3:
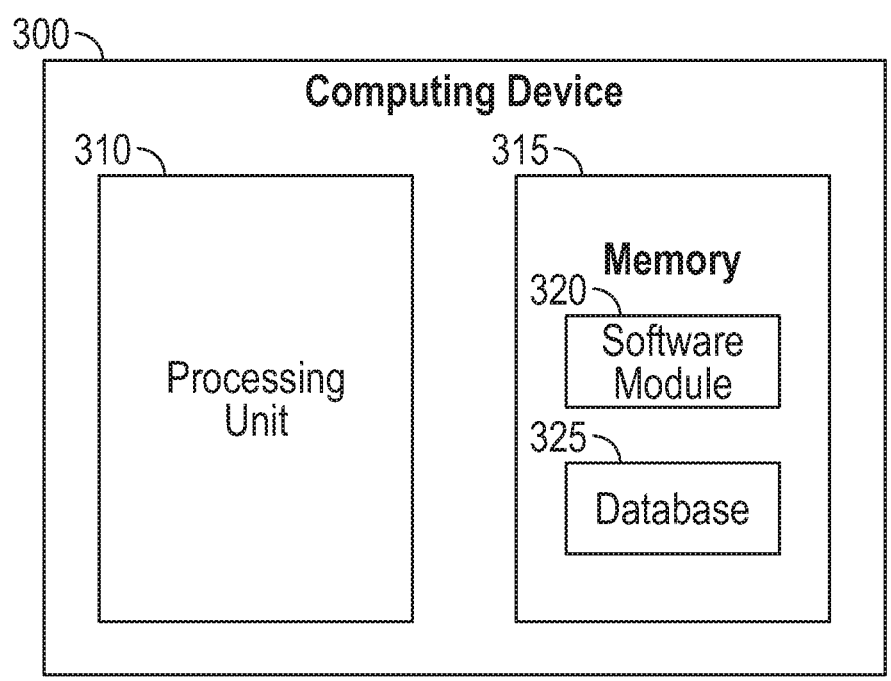
FIG. 3 is a block diagram of a computing device.

FIG. 3 shows computing device 300. As shown in FIG. 3, computing device 300 may include a processing unit 310 and a memory unit 315. Memory unit 315 may include a software module 320 and a database 325. While executing on processing unit 310, software module 320 may perform, for example, processes for providing echo cancellation, including for example, any one or more of the stages from method 200 described above with respect to FIG. 2. Computing device 300, for example, may provide an operating environment for echo cancelation component 102. Echo cancelation component 102 may operate in other environments and is not limited to computing device 300.

Computing device 300 may be implemented using a Wireless Fidelity (Wi-Fi) access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 300 may comprise any computer operating environment, such as hand-held devices, multiprocessor systems, microprocessor-based or programmable sender electronic devices, minicomputers, mainframe computers, and the like. Computing device 300 may also be practiced in distributed computing environments where tasks are performed by remote processing devices. The aforementioned systems and devices are examples and computing device 300 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 300 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
    receiving, by an echo cancelation component, a feedback signal corresponding to a plurality of downstream paths;
    receiving, during an upstream silence period, a sample of a combination upstream signal comprising a combination of upstream signals from a plurality of upstream paths; and
    creating an echo correcting signal using the received feedback signal and the received sample of the combination upstream signal, wherein creating the echo correcting signal comprises:
        determining downstream echoes by comparing the feedback signal and the combination upstream signal,
        determining a correlation between the determined downstream echoes and the feedback signal,
        creating a reference from the determined correlation, and
        creating the echo correcting signal from the feedback signal and the reference.

2. The method of claim 1, further comprising canceling the downstream echoes from the combination upstream signal based on the echo correcting signal.

3. The method of claim 1, wherein receiving the feedback signal comprises receiving the feedback signal comprising a combination of sampled outputs of a plurality of downstream amplifiers respectively corresponding to the plurality of downstream paths.

4. The method of claim 1, further comprising scheduling the upstream silence period.

5. The method of claim 1, wherein receiving, by the echo cancelation component, the feedback signal comprises receiving the feedback signal wherein the echo cancelation component is disposed in a node disposed in a Hybrid Fiber-Coaxial (HFC) network.

6. The method of claim 2, wherein canceling the downstream echoes comprises canceling the downstream echoes comprising a downstream signal and downstream noise generated by a plurality of downstream amplifiers respectively corresponding to the plurality of downstream paths.

7. The method of claim 2, further comprising passing the combination upstream signal upstream.

8. A system comprising:
    a memory storage; and
    a processor coupled to the memory storage, wherein the processor is operative to:
        receive a feedback signal corresponding to a plurality of downstream paths;
        receive, during an upstream silence period, a sample of a combination upstream signal comprising a combination of upstream signals from a plurality of upstream paths; and
        create an echo correcting signal using the received feedback signal and the received sample of the combination upstream signal, wherein the processor being operative to create the echo correcting signal comprises the processor being operative to:
            determine downstream echoes by comparing the feedback signal and the combination upstream signal,
            determine a correlation between the determined downstream echoes and the feedback signal,
            create a reference from the determined correlation, and
            create the echo correcting signal from the feedback signal and the reference.

9. The system of claim 8, wherein the processor is further operative to cancel the downstream echoes from the combination upstream signal based on the echo correcting signal.

10. The system of claim 8, wherein the processor being operative to receive the feedback signal comprises the processor being operative to receive the feedback signal comprising a combination of sampled outputs of a plurality of downstream amplifiers respectively corresponding to the plurality of downstream paths.

11. The system of claim 8, wherein the processor is further operative to schedule the upstream silence period.

12. The system of claim 8, wherein the processor is disposed in a node disposed in a Hybrid Fiber-Coaxial (HFC) network.

13. The system of claim 9, wherein the processor being operative to cancel the downstream echoes comprises the processor being operative to cancel the downstream echoes comprising a downstream signal and downstream noise generated by a plurality of downstream amplifiers respectively corresponding to the plurality of downstream paths.

14. The system of claim 9, wherein the processor is further operative to pass the combination upstream signal upstream.

15. A non-transitory computer-readable medium that stores a set of instructions which when executed perform a method comprising:
   receiving, by an echo cancelation component, a feedback signal corresponding to a plurality of downstream paths;
   receiving, during an upstream silence period, a sample of a combination upstream signal comprising a combination of upstream signals from a plurality of upstream paths; and
   creating an echo correcting signal using the received feedback signal and the received sample of the combination upstream signal, wherein creating the echo correcting signal comprises:
   determining downstream echoes by comparing the feedback signal and the combination upstream signal,
   determining a correlation between the determined downstream echoes and the feedback signal,
   creating a reference from the determined correlation, and
   creating the echo correcting signal from the feedback signal and the reference.

16. The non-transitory computer-readable medium of claim 15, further comprising canceling the downstream echoes from the combination upstream signal based on the created echo correcting signal.

17. The non-transitory computer-readable medium of claim 15, wherein receiving the feedback signal comprises receiving the feedback signal comprising a combination of sampled outputs of a plurality of downstream amplifiers respectively corresponding to the plurality of downstream paths.

18. The non-transitory computer-readable medium of claim 15, further comprising scheduling the upstream silence period.

19. The non-transitory computer-readable medium of claim 16, wherein canceling the downstream echoes comprises canceling the downstream echoes comprising a downstream signal and downstream noise generated by a plurality of downstream amplifiers respectively corresponding to the plurality of downstream paths.

20. The non-transitory computer-readable medium of claim 16, further comprising passing the combination upstream signal upstream.

* * * * *